United States Patent Office 3,782,971
Patented Jan. 1, 1974

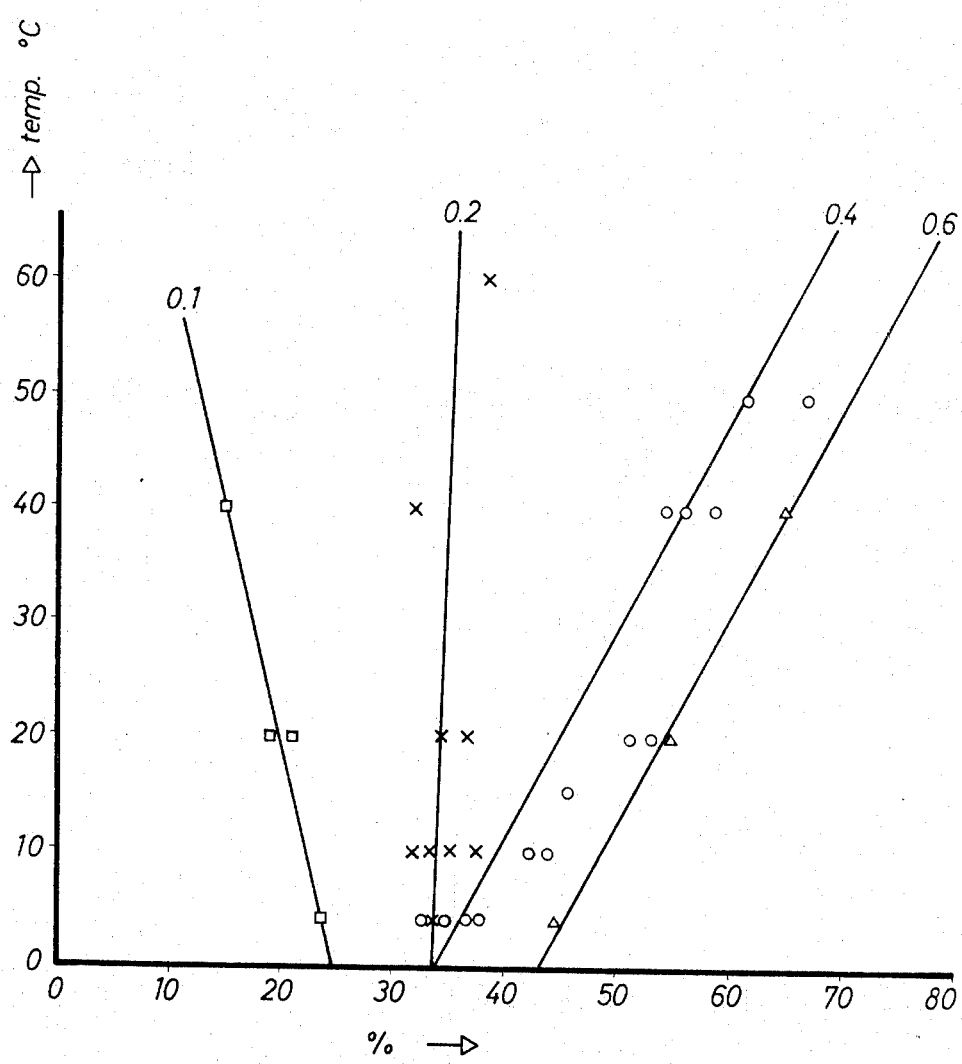

3,782,971
FOOD EMULSIONS CONTAINING MODIFIED PROTEINS
Johannes Hendrik van Roon, Vlaardingen, Netherlands, assignor to Lever Brothers Company, New York, N.Y.
Continuation-in-part of abandoned application Ser. No. 887,659, Dec. 23, 1969. This application Oct. 19, 1971, Ser. No. 190,510
Claims priority, application Great Britain, Dec. 31, 1968, 61,977/68
Int. Cl. A23d 3/00
U.S. Cl. 426—185                                                    3 Claims

ABSTRACT OF THE DISCLOSURE

Aqueous solutions having a pH of about 4.5–6 and containing particular modified proteins are used in the preparation of edible fat emulsions comprising 80–84% of an edible glyceride and having a continuous water phase. The modified protein is a N-acetyl milk protein containing about 20–40% N-acetylamino groups ($CH_3$—CO—NH—), calculated on the basis of total acetylatable amino groups ($NH_2$—), which total acetylatable amino groups are the lysine ε-amino groups and the α-amino groups of N-terminal amino acids in the milk protein. The modified protein improves the heat-stability of acidic oil-in-water emulsions so that emulsions with a good keepability can be prepared by pasteurization without the use of preservatives.

---

This application is a continuation-in-part of my copending application Ser. No. 887,659, filed Dec. 23, 1969, now abandoned.

This invention relates to an edible fat emulsion such as one containing 80–84% of an edible glyceride and having a continuous water phase, and to a process for the preparation of such an emulsion. The term fat herein used includes liquid fats, mostly called oils.

BACKGROUND OF INVENTION

The water phase used in edible fat emulsions often contains proteins, particularly milk protein.

For example, in Netherlands patent application No. 6817346 a fat emulsion having a continuous water phase is described, the water phase of which comprises skim milk as the main constituent.

The keeping qualities of such emulsions are poor, unless steps are taken to make the aqeuous phase substantially free, and to keep it free, of bacteria and spores. The bacteriological keepability can be improved by the use of preservatives. However, if the addition of a preservative, for instance sorbic acid, is to be avoided, the aqueous phase has to be sterilized, and sterilization of an aqueous phase containing protein gives problems which have not yet been satisfactorily solved. Thus sterilization at 135° C. for 15 seconds leads to a denaturation of the protein where so-called "browning" occurs, which involves coating by coagulated protein of the container in which sterilization is effected. An alternative method, in which such an aqueous phase is acidified to a pH of about 5 and subsequently pasteurized for 20 minutes at 80° C., again has the disadvantage that at least the greater part of the protein precipitates during the treatment. These disadvantages are particularly severe with emulsions of high fat content to which trisodium citrate has been added to improve the physical stability, for example emulsions containing more than 80% by weight of edible fat and a continuous protein-containing aqueous phase.

SCOPE OF INVENTION

The invention now provides a process for preparing an aqueous fat emulsion in which a fat, especially an edible glyceride, is emulsified with an aqueous solution of a particular modified protein to provide an oil-in-water emulsion, such as one containing from 80 to 84% by weight of fat, and also such an oil-in-water emulsion itself. The pH of the emulsion is in the range of from 4.5 to 6, preferably 5.0 to 5.5, and the emulsion has the advantage that it can be pasteurized.

Preferably the modified protein content of the aqueous phase of these emulsions is 1 to 5% preferably 1.5–4.0% by weight.

The modified protein which is used in the preparation of an emulsion according to the invention is an N-acetyl milk protein containing about 20–40% N-acetyl amino groups ($CH_3$—CO—NH—), calculated on the basis of total acetylatable amino groups ($NH_2$—), which total acetylatable amino groups are the lysine ε-amino groups and the α-amino groups of N-terminal amino acids in the milk protein.

One embodiment of the present invention is therefore an edible emulsion of a fat phase and a continuous aqueous phase, comprising about 80–84% of an edible glyceride fat, emulsion basis, said aqueous phase having a pH of between about 4.5 to about 6 and comprising a modified protein, said modified protein being an N-acetyl milk protein, the proportion of N-acetylamino groups ($CH_3$—CO—NH—) in said N-acetyl milk protein being about 20–40%, calculated on the basis of total acetylatable amino groups ($NH_2$—), said acetylatable amino groups being the lysine ε-amino groups and the α-amino groups of N-terminal amino acids.

Another embodiment of the present invention is a process for preparing an emulsion of a fat phase and a continuous aqueous phase, comprising dispersing about 80–84 parts by weight of a molten edible fat blend into about 16–20 parts by weight of an aqueous medium containing about 1–5% of a modified protein, to form an oil-in-water emulsion, said modified protein being an N-acetyl milk protein, the proportion of N-acetylamino groups ($CH_3$—CO—NH—) in said N-acetyl milk protein being about 20–40%, calculated on the basis of total acetylatable amino groups ($NH_2$—), said acetylatable amino groups being the lysine ε-amino groups and the α-amino groups of N-terminal amino acids.

If necessary, the emulsion can be homogenized and, for the bnefit of the invention to occur, should preferably be pasteurized.

CHEMICAL STRUCTURE OF THE MODIFIED PROTEIN

Milk protein is a well-known product, although its structure has not been fully elucidated. But it is known that its constituents, mainly casein, lactoglobulin and lactalbumin, contain lysine (see e.g. Ullmanns Enzyklopaedie der technischen Chemie 12 (1960) 485) and N-terminal amino acids, each having free amino groups.

The structure of a protein can, in general, be indicated by the following formula

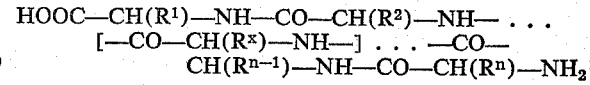

in which $n$ is the total number of amino acid residues in the protein molecule and $x$ is a parameter, which is 3,4,5 ... $n-2$. When $R^x$=—$(CH_2)_4NH_2$, the corresponding amino acid HOOC—CH($R^x$)—$NH_2$ is lysine, and the lysine resdiue in the protein is

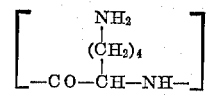

The ε-amino groups of the lysine residues can be acetylated to give

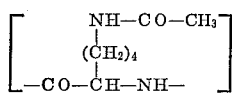

in the same way the α-amino groups of the N-terminal amino acid residues [—CO—CH(R$^n$)—NH$_2$] can be acetylated to give [—CO—CH(R$^n$)—NH—CO—CH$_3$].

PREPARATION OF MODIFIED PROTEIN

The modified proteins which are used in the emulsions according to the invention can be prepared by reacting a milk protein with an acetylating agent until about 20–40% of the total reactive amino groups present in the normal milk protein is converted to acetylamino groups. The extent of acetylation of the amino groups can be determined by the method of Frenkel-Conrat, described in "Methods in Enzymology," (Academic Press, New York), chapter IV, page 247, which uses the ninhydrin reaction. As the reactive, acetylatable amino groups in a protein include amino groups other than those due to lysine, i.e. N-terminal amino groups, such reactive groups are also included in measuring the degree of acetylation.

The effect of the degree of acetylation on the denaturation of peptides can be determined by the method of Ingram described in Nature, 1956, 178, 792, using "peptide mapping." This method is based on the enzymatic splitting of the protein into peptides followed by separation of the peptides by chromatography and electrophoresis. When applying this method, using trypsin and chymotrypsin, to proteins with various degrees of acetylation it has now been observed from the "maps" obtained that the characteristics of the proteins do not substantially change so long as not more than 40% of the reactive, acetylatable amino groups have been acetylated, whereas at a higher degree of acetylation clear evidence of denaturation is found.

It has also been found that the emulsion stability is influenced by the degree of acetylation. Experiments with aqueous solutions of partially acetylated milk protein having degrees of acetylation of more than 40% gave less stable emulsions than with a degre of acetylation below this value. The optimum results were obtained with a degree of acetylation of 33–38%.

The maximum degree of acetylation permissible in the product and process according to the invention is thus 40%.

The minimum degree of acetylation required is determined by the pH necessary to impart the aqueous phase the desired bacteriostatic properties and generally this pH will be in the range of from 5 to 5.2. It has been found that a minimum degree of acetylation is about 20%. Below this percentage the benefits are not obtained to a sufficient extent.

In order to obtain the desired degree of acetylation the milk protein is preferably acetylated in the form of an aqueous solution. Aqueous milk protein solutions that are very suitable as starting materials for the process of the invention are skim milk, in natural, concentrated or diluted form, reconstituted skim milk prepared by dissolving milk powder in water, whey, and aqueous solutions of milk serum proteins.

Preferably acetic anhydride is used as acetylating agent, but other acetylating agents, such as acetyl chloride, can also be used.

The degree of acetylation depends on various factors, such as temperature and amount of acetylating agent. With acetic anhydride reaction at ambient temperatures and above is generally rapid and complete within a few minutes, and the degree of acetylation attained for a given amount of acetylating agent depends upon the relative rate of reaction with the water present at the temperature concerned. The degree of acetylation is also influenced by the presence of other substances, such as trisodium citrate.

In aqueous solutions intended for use in fat emulsions with a high percentage of fat, as mentioned above, in which trisodium citrate is incorporated as stabilizer, this salt can be added to the aqueous solution before acetylation. In practice from 0.5 to 2 g. of trisodium citrate is added per 100 ml. of normal protein solution, that is, a solution containing about 3.5 g. of protein per 100 ml. of solution. However, the influence of change in concentration of trisodium citrate on the degree of aceylation is slight.

Preferably temperatures of from 0° to 25° C. are employed. To maintain the pH of the protein-containing solution above the value at which the protein precipitates during the acetylation reaction, acetic acid formed can be progressively neutralized by the addition of alkali. Preferably the pH is maintained at from 4.5 to 8.5, and especially from 5 to 7.5.

FIG. 1 of the accompanying drawing illustrates how when skim milk containing 1% by weight of trisodium citrate is used as the proteinaceous solution and acetic anhydride as the acetylating agent, the degree of acetylation attained is dependent on the temperature and the amount of acetic anhydride. In the figure, degree of acetylation in percent conversion of acetylatable amino groups is plotted against temperature for a series of concentrations of acetic anhydride varying from 0.1 to 0.6%, for reactions otherwise carried out under comparable conditions.

For solutions of protein content higher or lower than that of skim milk the relationship between degree of acetylation, temperature and amount of acetic anhydride can be determined in an analogous manner. The conditions for acetylation on an industrial scale can then be worked out.

If desired other substances can be added to the solution before or after acetylation, for instance, to improve flavor. Such substances added before acetylation should, of course, not be sensitive to the acetylating agent.

The modified proteins can be isolated from the solution obtained after acetylation, for instance, by freeze-drying or spraydrying. However, when they are to be used for the preparation of emulsions it is preferable not to isolate the modified proteins but to use the acetylated protein solutions directly.

It has also been found that persons liable to suffer from so-called "milk allergy" on consuming foodstuffs containing normal milk protein show a reduced tendency to allergic reactions on consumption of actylated milk proteins of the invention.

The invention is illustrated by the following examples, in which tempertures are in ° C. Examples 1 to 3 describe the preparation of modified proteins having a degree of acetylation of between about 20% to about 38% and Examples 4–9 the preparation of emulsions containing such modified proteins.

Example I

To 100 ml. of pasteurized skim milk containing 3.5% total proteins by weight, 1 g. of trisodium citrate (as dihydrate) was added and allowed to dissolve at ambient temperature. After cooling to 5° 0.4 ml. of acetic anhydride was added, the mixture thoroughly stirred and the pH of the solution obtained was adjusted to 5, and the solution pasteurized for 30 minutes at 80°. After cooling, the degree of acetylation was determined by the method of Fraenkel-Conrat, and found to be 38%. No precipitation occurred during the pasteurization whereas pasteurization of untreated skim milk under the same conditions resulted in coagulation of the proteins.

Example II

To 100 ml. of pasteurized skim milk at 20° C. 1 g. of trisodium citrate dihydrate was added and allowed to dissolve during 30 minutes: 0.1 ml. of acetic anhydride was then added and the mixture thoroughly stirred for 45 minutes at 20° C. The degree of acetylation of the protein in the resulting was determined and found to be 20%.

Example III

To 100 ml. of pasteurized skim milk at 20° C. 1 g. of trisodium citrate dihydrate was added and allowed to dissolve during 30 minutes. The solution was heated to 60° C. and 0.2 ml. of acetic anhydride then added, followed by vigorous stirring at 60° C. for 30 minutes. The resulting solution was cooled, its pH adjusted to 5, and the degree of acetylation of its protein determined as 35%.

Example IV

This example illustrates the preparation of an oil-in-water emulsion. To a margarine fat blend having dilatation values $D_5=89$; $D_{15}=665$; $D_{20}=420$; $D_{25}=245$; $D_{30}=125$; and $D_{35}=25$ (measured according to the method described by H. A. Boekenoogen in "Analysis and Characteristics of Oils, Fats and Fat Products," vol. 1, 1964, pages 143–5) was added 0.5% by weight of distilled partial glyceride esters of a mixture of palmitic and stearic acids containing 90% of monoglycerides. 83 parts of this fat composition was melted by heating to about 60° and slowly added to 17 parts of the aqueous N-acetylated skim milk protein solution described in Example I, while stirring with a propeller stirrer in a jacketed vessel at 60° C., to form an oil-in-water emulsion. The emulsion of pH 5 formed was then homogenised in a colloid mill adjusted to a clearance of 0.6 mm. and with an average circumferential speed of 11 m./sec., pasteurized at 80° for 30 minutes, poured into containers under aseptic conditions and stored for 12 hours at 5°. After 6 weeks' storage, the emulsion had not changed inconsistency and no growth of micro-organisms was observed when the emulsion was kept at 20°.

Examples V–VII and Comparative Examples A–C

These examples show the effect of the degree of acetylation on the emulsion stability, which was determined in the pre-emulsion before homogenizing. The stability and the oil dispersion are classified as follows:
1 = satisfactory
2 = reasonable
3 = coarse

| Ex. | Acetylated NH$_2$ groups (percent) | Stability of the emulsion (score) | Consistency of the O/W-emulsion at 15° C. After 1 day | After 5 days | Exudation of oil or water at room-temperature |
|---|---|---|---|---|---|
| 5 | 33 | 1 | Satisfactory | Somewhat coarsened. | None. |
| 6 | 35 | 1 | do | Satisfactory | Do. |
| 7 | 36.5 | 1 | do | do | Very little oil. |
| A | 56.5 | 2 | do | Poor | Much water. |
| B | 59 | 3 | do | Sticky | None. |
| C | 67.5 | 3 | do | Loose | Much water. |

The water phase was prepared by acetylating skim milk containing 1% sodium citrate with 0.4% by volume acetic anhydride at different temperatures (Examples V–VII at 4° C., Examples A and B at 50° C. and Example C at 60° C.) and adjusting the pH at about 5.1.

As fat phase was used a fat composition used for good quality margarines having dilatation values of $D_{15}=460$; $D_{20}=315$; $D_{25}=175$; $D_{30}=60$ and $D_{35}=0$, and containing 0.5% monoglycerides and annatto oil-soluble color. A fine oil-in-water-emulsion containing about 70% fat was prepared with an Ultra-Turrax stirrer at 70° C., the remainder of the fat phase was added with a perforated stirrer in 2 minutes while stirring rapidly (about 270 r.p.m.). This pre-emulsion (containing 80% fat) was homogenized at 70° C. and filled into plastic tubs which were kept overnight at 5° C., stored at 15° C. and assessed after 1 and 5 days. By a satisfactory consistency is understood that the product has a plastic and elastic consistency.

Example VIII

In the same way as in Examples V–VII an oil-in-water emulsion was prepared in which the aqueous phase was prepared by acetylation with 0.2% by volume at 20° C. and acidification to pH=5.1 giving a N-acetyl protein with a degree of acetylation of about 35%. Reasonable emulsions were prepared which did not coarsen on cooling.

Example IX

An aqueous phase was prepared by acetylating skim milk containing 1% sodium citrate with 0.4% by volume acetic anhydride at 4° C., giving a degree of acetylation of about 35% and a pH of about 5.1. One part of the water phase was not heated above 60° C., a second part was heated for 30 minutes at 80° C. and a third part was pasteurized for 10 minutes at 72° C. The three water phases were mixed with the same fat phase as in Examples V–VII. The emulsion stability score of each pre-emulsion was 1. After homogenizing, keeping overnight at 5° C. and storing at 15° C., the three emulsions were assessed after 1 and 5 days' storage. The first and second ones were satisfactory and showed no water or oil separation. The third one had a sticky consistency and showed some water exudation but was acceptable. This example shows that pasteurization of the water phase has very little influence on the emulsion-stabilizing properties of the partially acetylated proteins.

What is claimed is:
1. A pasteurized edible emulsion of a fat phase and a continuous, protein-containing, aqueous phase, comprising about 80%–84% by weight of an edible glyceride fat, emulsion basis, about 20%–16% by weight of an aqueous phase having a pH of about 4.5–6, the protein being present in an amount of about 1%–5% by weight, aqueous phase basis, and consisting essentially of an N-acetyl milk protein, the proportion of N-acetylamino groups in the N-acetyl milk protein being about 20%–40%, calculated on the basis of total acetylatable amino groups, being the lysine ε-amino groups and the α-amino groups of N-terminal amino acids.

2. An emulsion in accordance with claim 1 wherein the N-acetyl milk protein is present in the proportion of about 1.5%–4% by weight, aqueous phase basis.

3. An emulsion in accordance with claim 1, wherein the aqueous phase has a pH of about 5.0–5.5.

References Cited
FOREIGN PATENTS
5,406  1901  Great Britain. _____ 99—20

JOSEPH M. GOLIAN, Primary Examiner

U.S. Cl. X.R.
99—54, 211, 212